Aug. 8, 1933.  W. F. HEINEMAN  1,921,227

METHOD OF ALIGNING EDGES FOR FLASH WELDING TUBES

Filed Oct. 19, 1929

INVENTOR.
Warren F. Heineman
BY
ATTORNEY.

Patented Aug. 8, 1933

1,921,227

UNITED STATES PATENT OFFICE 1,921,227

METHOD OF ALIGNING EDGES FOR FLASH WELDING TUBES

Warren F. Heineman, Shorewood, Wis., assignor to A. O. Smith Corporation, Milwaukee, Wis., a Corporation of New York Application October 19, 1929. Serial No. 400,889

5 Claims. (Cl. 219—10)

This invention relates to a method of electrically welding longitudinal seams in tubular articles wherein an electric arc is established and maintained between the edges to be welded throughout the full common length thereof to heat the same to a welding temperature, after which the edges are pressed together to complete the welding operation and to produce an integral tubular structure.

One of the obstacles attending previous attempts to manufacture tubular articles of substantial lengths by the method above referred to was in the inability to maintain an arc having uniform characteristics throughout the full length of the edges, and as a result thereof, the tubular article was of non-uniform diameter and had a defectively welded seam which was unacceptable in commerce. This failure was due to the difficulty of bringing the edges to be welded into accurate alignment prior to establishing the arc for heating the same to welding temperature.

To this end, the present invention has for its object to provide a method for bringing the longitudinal edges into accurate alignment for welding.

The invention is illustrated in the accompanying drawing in which.

The invention briefly resides in utilizing the rigidity of the walls of the tubular article to force the edges into accurate welding alignment. The invention is particularly applicable to the manufacture of pipe sections of uniform diameter and of substantial lengths such as those now used in commerce for the transportation of oil, gas, and other fluids.

Figure 1:
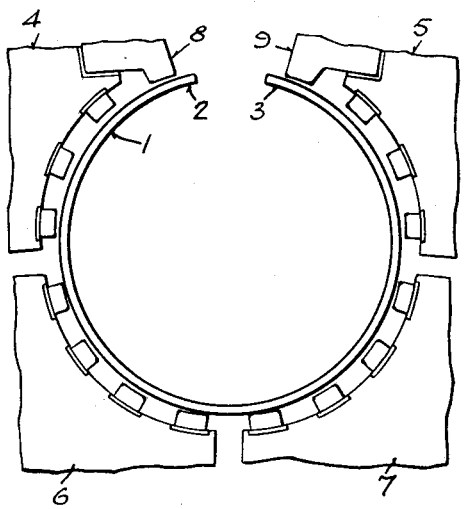
Fig. 1 is an end elevation showing the pipe section in position in the welding machine.

Referring to the drawing, the sheet metal blank 1, having a length corresponding to that of the pipe section and having a width in proportion to the circumference thereof, is rolled or bent in any suitable manner into a tubular blank having its longitudinal edges 2 and 3 spaced from each other by a substantial gap as indicated in Fig. 1.

Figure 2:
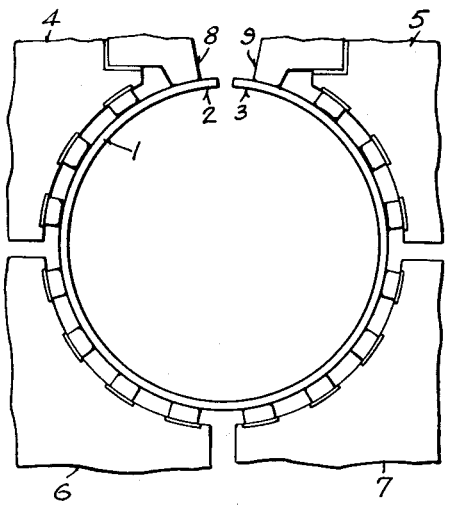
Fig. 2 is a similar view showing the pipe section with its edges in proper welding alignment.
Figure 3:
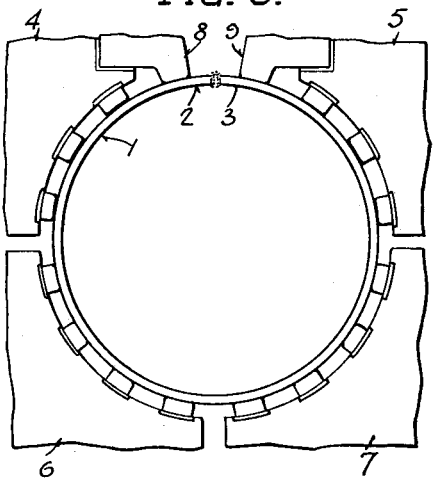
Fig. 3 illustrates the position of the edges during the flashing operation.
Figure 4:
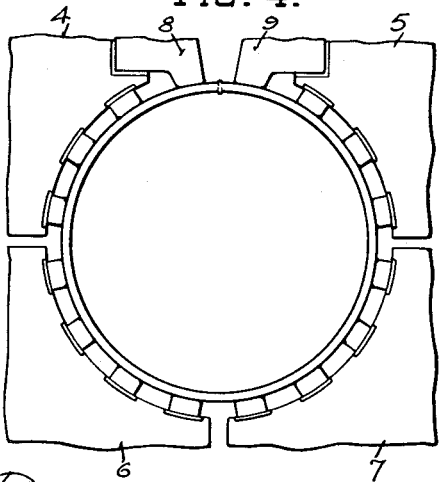
Fig. 4 is a similar view illustrating the final welding operation.
Figure 5:
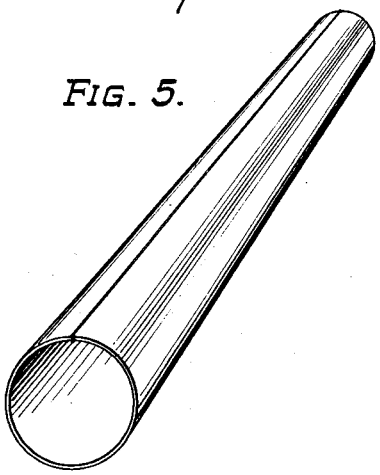
Fig. 5 is a perspective view of a finished pipe section.

The tubular blank thus formed is thereafter placed in a welding machine having a plurality of clamping dies adapted to encompass substantially the entire surface of the tubular blank. The clamping dies are illustrated diagrammatically, in Figs. 1, 2, 3 and 4, as comprising a plurality of elements 4, 5, 6 and 7, which are adapted to be operated by suitable means (not shown) to close about the tubular blank and to flex the walls of the latter so as to force the edges to be welded toward each other. The rigid character of the walls of the tubular article tends to force the same to assume the contour of the die recesses which are of predetermined and desired size. By forcing the tubular blank to conform with the surfaces of the die, the edges are brought into accurate alignment, both vertically and horizontally, and uniformly spaced, as shown in Fig. 2, for the welding operation.

The welding current is then applied to electrodes 8 and 9 which contact with the pipe blank on opposite sides of the seam, and the clamping dies are further operated to close upon the blank and to cause the edges to approach each other until a flashing arc is established between the edges. The edges are caused to approach each other at the proper speed to maintain the flashing arc until the edges have reached the proper welding heat. The edges are then rapidly pressed together to weld the same.

The welding current may be withdrawn either before or after the final application of pressure, although it may be advisable to open the welding circuit substantially simultaneously with the final pressure application. While it is preferred to apply the welding current prior to any contact of the edges and to establish the flashing arc by slowly moving the edges together until some small points of contact are established therebetween (as set forth in my copending application, Serial No. 327,925, filed December 22, 1928), it is not desired to limit the invention thereto, as the flashing arc may be established in any suitable manner such as by contacting the edges prior to the application of the welding current and then separating the edges to establish the arc. This latter method, however, requires a reversal of movement of the clamping members during the heating operation which is not desirable, since it adversely affects the source of the welding current.

By the present invention, the edges to be welded are maintained in accurate alignment throughout the welding operation by means of the rigidity of the metal which tends to oppose the movement of the clamping dies and, by maintaining the edges in accurate alignment, a uniform heating of the same throughout the full common length thereof is obtained, thus insuring the production of a pipe of substantially predetermined uniform diameter and having a welded seam of uniform characteristics extending throughout its length.

Having thus described the invention, it is understood that various modifications may be made within the scope of the accompanying claims.

I claim:

1. The method of making pipe from preformed blanks which consists of aligning the edges of the blank by applying external forces which coact with the inherent resiliency of the blank to guide the edges toward one another continuously reducing the cross-sectional over-all dimensions, the external forces being applied substantially throughout the periphery as the blank approaches a predetermined shape to effect a movement of the edges which will cause them to meet evenly, establishing an electric arc between the edges to fuse them and bring them to a welding condition as they approach one another, and finally forcing the edges into engagement to weld them, the reduction of the cross-sectional over-all dimensions being stopped when the blank is reduced to a predetermined size and welded giving a pipe of a predetermined size and shape.

2. The method of making pipe from sheet metal which comprises forming a blank by bending a rectangular sheet of metal to tubular shape with its longitudinal edges in spaced relationship, applying force to the blank externally thereof, which force is directed to act against the resilient resistance of the blank and is distributed to confine the blank and progressively bring it to a predetermined form or cross sectional shape, continuing the application of such force until the blank has assumed the approximate desired cross sectional shape with its edges in closely spaced parallel relationship and with the confining applied forces engaging the exterior of the blank substantially completely around the circumference thereof, establishing an arc from one to the other edge, and, while maintaining the circumferentially confining force on the blank, feeding the edges together to impart final shape to the blank and to flash-weld the edges throughout their length.

3. The method of making pipe from tubular metal blanks which comprises, applying an external and encompassing pressure to the blank directed to flex the walls of the blank to move the edges thereof into alinement and effect a uniform and gradual shaping of the blank to the desired contour through the cooperative action of the encompassing pressure and the inherent resiliency of the blank opposing its flexing, fusing the edges of the blank by an electric arc and bringing them to a welding condition, feeding the edges toward one another during the welding operation, and finally forcing the edges into engagement by continued application of the encompassing pressure to form a pipe conforming in size and contour to the outline of contact of the encompassing pressure.

4. The method of making pipe from tubular metal blanks which comprises, applying an external and encompassing pressure to the blank directed to flex the walls of the blank to move the edges thereof into alinement and effect a uniform and gradual reduction in the diameter and shaping of the blank to the desired contour through the cooperative action of the encompassing pressure and the inherent resiliency of the blank opposing its flexing, fusing the edges of the blank by an electric arc and bringing them to a welding condition, feeding the edges toward one another during the welding operation, and finally forcing the edges into engagement by continued application of the encompassing pressure to form a pipe conforming in size and contour to the outline of contact of the encompassing pressure.

5. The method of making pipe from preformed tubular blanks which comprises, applying circumferentially thereto external and encompassing pressure inwardly directed to flex the walls of the blank to a predetermined shape or contour and to confine the flexed blank in a desired shape with its edges in spaced parallel relationship, continuing the application of the encompassing pressure to progressively bring the applied pressure into substantially full engagement with the exterior of the blank, establish an arc from one to the other edge, and, while maintaining the circumferentially confining force on the blank, flash-weld the edges together to produce a pipe conforming in size and contour to the outline of contact of the encompassing pressure.

WARREN F. HEINEMAN.